United States Patent [19]
Goodwin, III

[11] Patent Number: 5,999,913
[45] Date of Patent: Dec. 7, 1999

[54] ELECTRONIC PRICE LABEL SYSTEM WHICH DISPLAYS PRICES IN MULTIPLE CURRENCIES

[75] Inventor: John C. Goodwin, III, Suwanee, Ga.

[73] Assignee: NCR Corporation, Dayton, Ohio

[21] Appl. No.: 08/994,786

[22] Filed: Dec. 19, 1997

[51] Int. Cl.⁶ .............................. G06F 15/16; G09F 3/00
[52] U.S. Cl. ................................ 705/20; 705/26; 705/21; 705/16; 705/14; 705/1; 340/815.53; 340/825.49
[58] Field of Search .................................. 705/20, 26, 27, 705/16, 416, 21, 1; 235/61, 383; 340/825.3, 825.35, 815.4, 815.53, 815.49

[56] References Cited

U.S. PATENT DOCUMENTS

| | | | |
|---|---|---|---|
| 4,002,886 | 1/1977 | Sundelin | 235/61.7 R |
| 4,500,880 | 2/1985 | Gomersall et al. | 340/825.35 |
| 4,924,363 | 5/1990 | Kornelson | 362/125 |
| 4,926,368 | 5/1990 | Morita et al. | 364/715.05 |
| 5,172,314 | 12/1992 | Poland et al. | 364/401 |
| 5,448,226 | 9/1995 | Failing, Jr. et al. | 340/825.35 |
| 5,461,561 | 10/1995 | Ackerman et al. | 364/401 |
| 5,847,378 | 12/1998 | Goodwin, III | 235/383 |
| 5,854,476 | 12/1998 | Goodwin, III | 235/383 |
| 5,870,714 | 2/1999 | Shetty et al. | 705/20 |
| 5,898,383 | 4/1999 | Forsythe | 340/825.35 |
| 5,907,143 | 5/1999 | Goodwin, III | 235/383 |
| 5,917,422 | 6/1999 | Adamec et al. | 340/825.35 |
| 5,918,212 | 6/1999 | Goodwin, III | 705/20 |
| 5,926,797 | 7/1999 | Goodwin, III | 705/20 |
| 5,929,770 | 7/1999 | Faita | 340/825.35 |

FOREIGN PATENT DOCUMENTS

| | | | |
|---|---|---|---|
| 223388 | 5/1987 | European Pat. Off. | G06F 15/30 |
| 837411 | 4/1998 | European Pat. Off. | G06F 17/60 |

OTHER PUBLICATIONS

Telepanel Europe S.A. Catalogue, Jan. 1, 1996.
Telepanel Adds Bozzuto's to Growing Customer Base, Develops European Product, and Reports Results for the Nine Months and Third Quarter Ended Oct. 31, 1996, Business Wire, Dec. 18, 1996.
Round Table on practical aspects of the changeover to the euro, http://amue.if.net/business/ec/rep–en.htm, 2.2 What are the costs and benefits of dual displays?, May 15, 1997.

*Primary Examiner*—Allen R. MacDonald
*Assistant Examiner*—John Campa
*Attorney, Agent, or Firm*—Paul W. Martin; Peter H. Priest

[57] ABSTRACT

An electronic price label (EPL) system which is capable of displaying price information in terms of a plurality of different currencies. The system includes an EPL and a computer. The EPL includes a display, and a control circuit which causes the display to display price information based upon a plurality of different currencies. The computer sends messages to the EPL instructing the EPL to display predetermined price information based upon a predetermined currency.

20 Claims, 5 Drawing Sheets

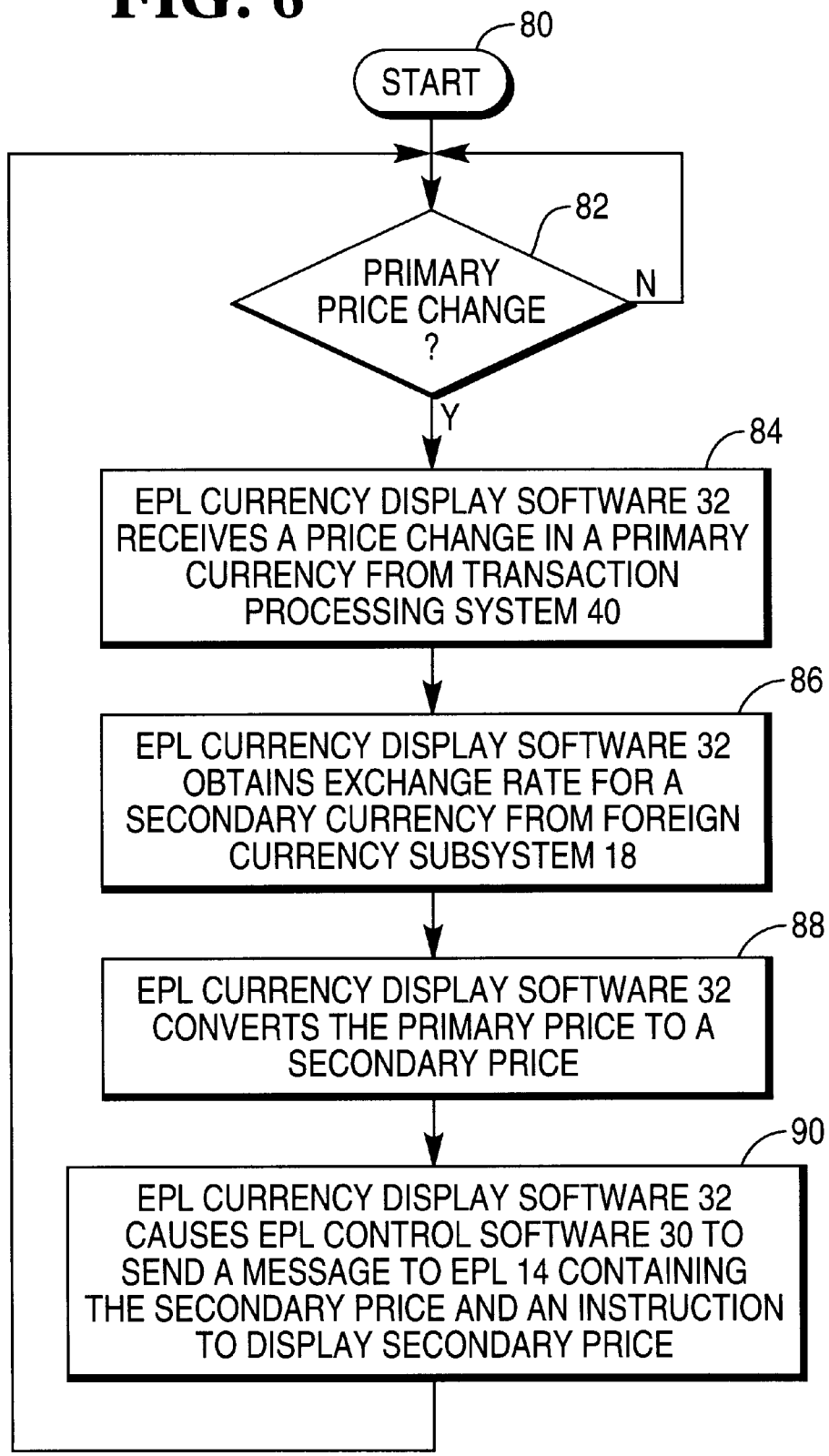

5,999,913

ELECTRONIC PRICE LABEL SYSTEM WHICH DISPLAYS PRICES IN MULTIPLE CURRENCIES

BACKGROUND OF THE INVENTION

The present invention relates to electronic price label systems, and more specifically to an electronic price label system which displays prices in multiple currencies.

Electronic price label (EPL) systems typically include a plurality of EPLs for each merchandise item in a transaction establishment. EPLs typically display the price of corresponding merchandise items on transaction establishment shelves and are typically attached to a rail along the leading edge of the shelves. A transaction establishment may contain thousands of EPLs to display the prices of the merchandise items. The EPLs are coupled to a central server from where information about the EPLs is typically maintained in an EPL data file. Price information displayed by the EPLs is obtained from the PLU file.

In some transaction establishments it would be desirable to display prices in multiple currencies, particularly in countries in which multiple currencies are in use. Multiple prices may easily be displayed using conventional paper shelf tags. Given the many advantages of EPLs over conventional paper shelf tags, it would also be desirable to provide an electronic price label system which displays prices in multiple currencies.

SUMMARY OF THE INVENTION

In accordance with the teachings of the present invention, an electronic price label (EPL) system which displays prices in multiple currencies is provided.

The system includes an EPL and a computer. The EPL includes a display, and a control circuit which causes the display to display price information based upon a plurality of different currencies. The computer sends messages to the EPL instructing the EPL to display predetermined price information based upon a predetermined currency.

In a first embodiment, the control circuit causes the display to display a currency symbol to inform a viewer of the currency upon which the price information is based.

In a second embodiment, the EPL further includes a housing containing the display and the control circuit and including a front surface containing an aperture which exposes the display, and an overlay attached to the front surface marked with a symbol for each of the different currencies. The control circuit further causes the display to display a currency indicator adjacent one of the symbols to inform a viewer of the currency upon which the price information is based.

A method of displaying secondary price information by an electronic price label (EPL) based upon a secondary currency in addition to primary price information based upon a primary currency includes the steps of obtaining the primary price information by a computer, obtaining secondary currency exchange rate information for converting the primary price information to the secondary price information by the computer, converting the primary price information to the secondary price information using the secondary currency exchange rate information by the computer, and sending a message to the EPL instructing the EPL to display the secondary price information by the computer.

In a first embodiment, the last two steps are performed each time the secondary currency exchange rate information has changed.

In a second embodiment, the last two steps are performed each time the primary price information has changed.

It is accordingly an object of the present invention to provide both an EPL and an EPL system which are capable of displaying prices in multiple currencies.

It is another object of the present invention to provide an EPL which displays prices in multiple currencies.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 6 is a flow diagram illustrating a second method of displaying prices in a plurality of different currencies.

DETAILED DESCRIPTION OF THE PREFERRED EMBODIMENT

Figure 1:
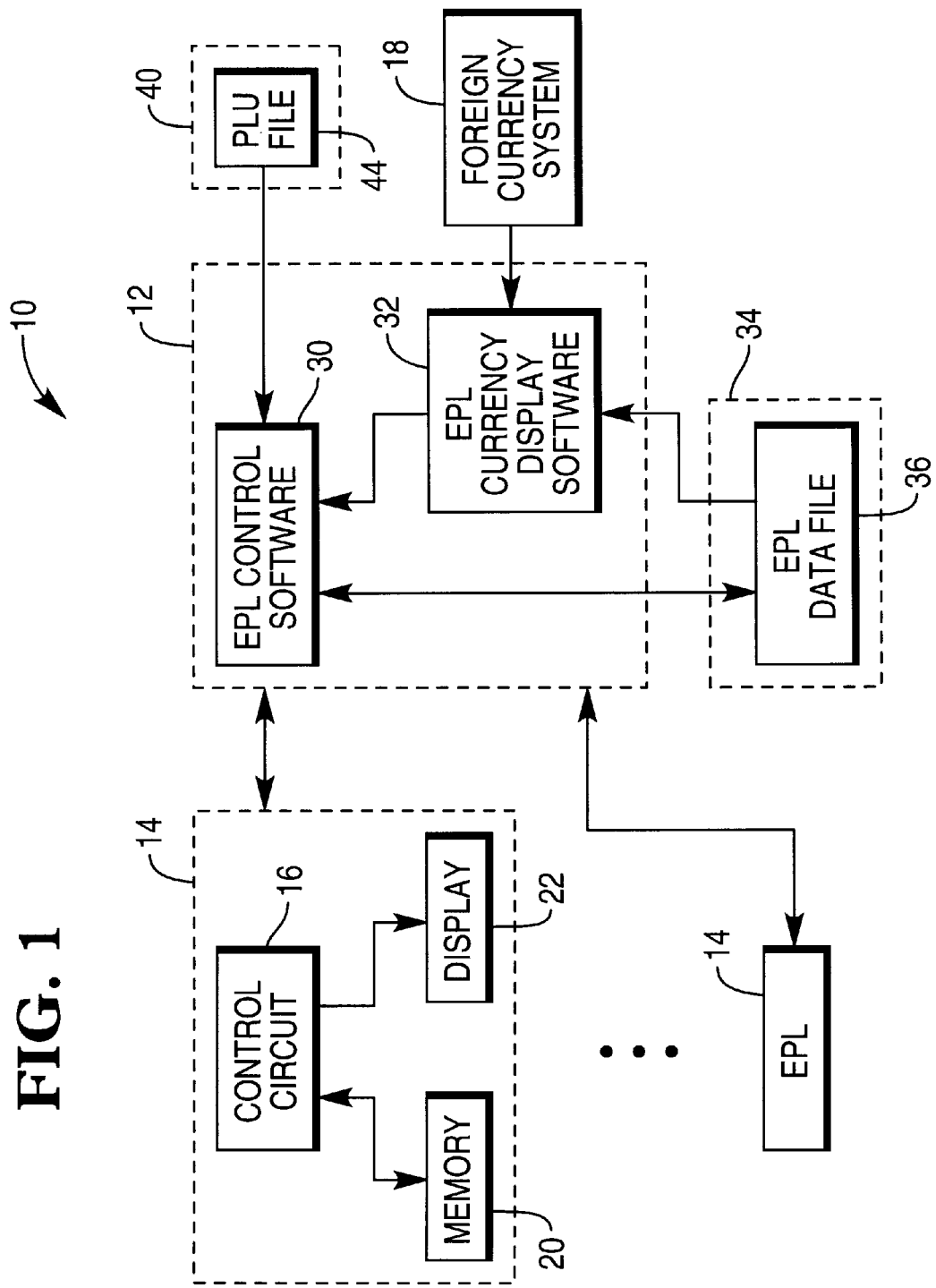
FIG. 1 is a block diagram of a first embodiment of a transaction system including an EPL system.
Figure 5:
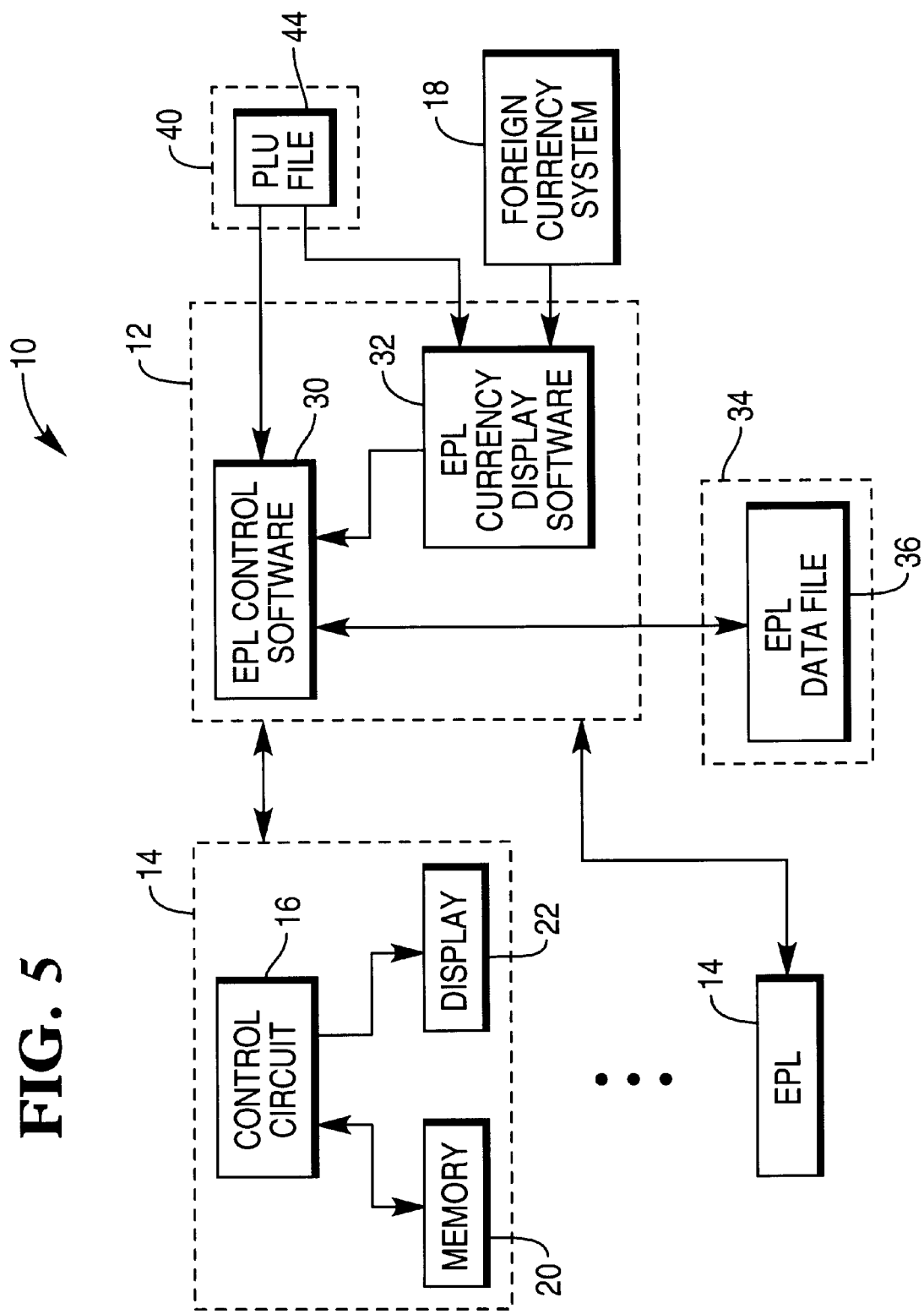
FIG. 5 is a block diagram of a second embodiment of a transaction system including an EPL system.

Referring now to FIGS. 1 and 5, transaction processing system 10 primarily includes EPL computer 12 and transaction computer 40.

EPL computer 12 executes EPL software 30 which records, schedules, and transmits all messages to EPLs 14 and analyzes status messages from EPLs 14. Messages from EPL computer 12 include price change messages, diagnostic messages, promotional messages, and currency display control messages. EPL computer 12 may communicate with EPLs 14 using wireless communication, cable communication, or a combination of both.

EPL computer 12 maintains and uses EPL data file 36, which contains item information, EPL identification information, price information, and currency information for EPLs 14. Price information is preferably in the form of a price checksum calculated from the price information in price look-up (PLU) file 44.

EPL computer 12 executes EPL currency display control software 32 which determines the currency in which prices are displayed and the prices displayed by EPLs 14. EPL currency display control software 32 is alerted to changes in exchange rate information from foreign currency system 18, which may be any network source of foreign currency information. To display total and unit prices in terms of a secondary currency, EPL currency display control software 32 converts primary currency price information from either EPL data file 36 (FIG. 1) or PLU file 44 (FIG. 5) to the secondary currency price information using the exchange rate information. EPL currency display control software 32 uses EPL control software 30 to send currency control messages to EPLs 14 containing the secondary currency price information and a command to display the secondary currency price information. EPL currency display control software 32 automatically initiates price changes for the displayed secondary currency whenever it determines that a change in the primary price has occurred or when a change in exchange rate for the secondary currency has occurred.

Transaction computer 40 may be co-located and linked to EPL computer 12 in a single transaction establishment or be coupled to a plurality of EPL computers 12 in a plurality of different transaction establishments. Transaction computer 40 and EPL computer 12 are linked through any known method, such as through a network or telephone system.

Transaction computer 40 maintains PLU data file and notifies EPL currency display software 32 of price changes in the primary currency. When transaction computer 40 controls prices for many transaction establishments, each transaction establishment also includes a transaction computer 40 with its own PLU data file 44.

Storage medium 34 stores EPL data file 36.

EPLs 14 include control circuit 16, memory 20, and display 22.

Control circuit 16 controls the internal operation of EPLs 14. Control circuit 16 stores received messages from EPL computer 12 and transmits response messages to EPL computer 12. Control circuit 16 also controls the display of price, currency, and other promotional information, including blinking or flashing of display contents.

Memory 20 preferably includes a plurality of data registers. Memory 20 stores price, currency, and other promotional information necessary for the proper operation of EPLs 14.

Display 22 displays price, currency, and other promotional information. Display 22 is preferably a liquid crystal display (LCD).

Figure 2:
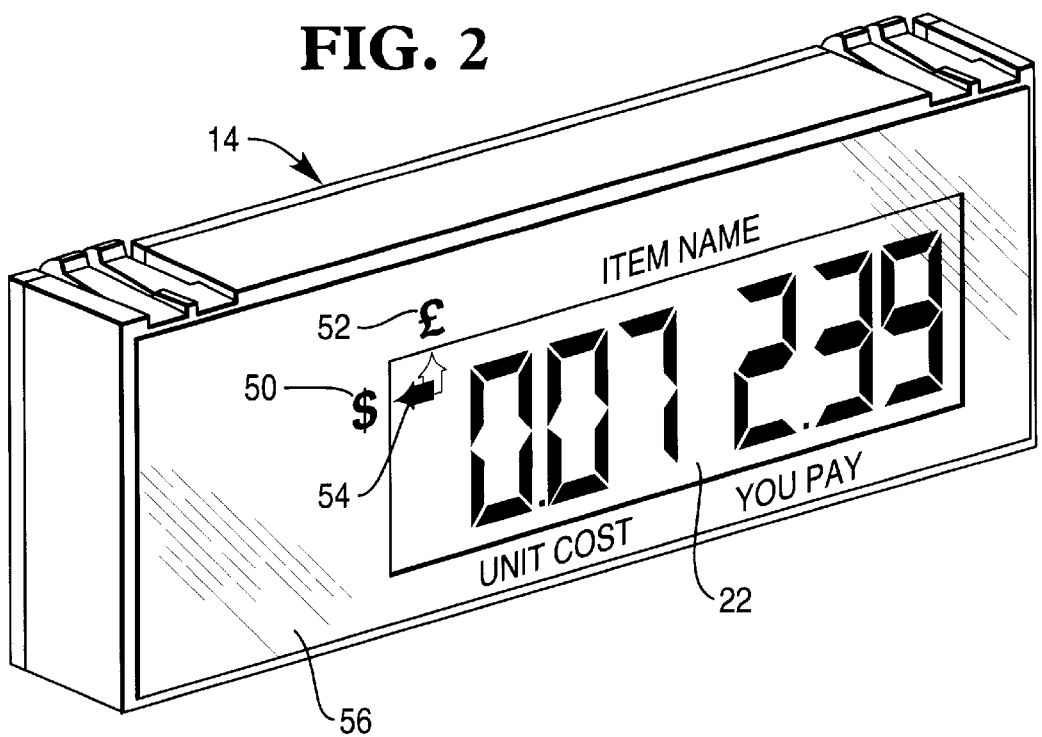
FIG. 2 is a perspective view of an EPL displaying a first currency indicator.

Turning now to FIG. 2, a first embodiment of EPL 14 is shown in more detail.

In this embodiment, currency symbols 50 and 52 for primary and secondary currencies are printed on overlay 56. Overlay 56 is made of paper or plastic and an adhesive to attach it to EPL 14. Overlay 56 contains information that changes so infrequently that there is little need to display it electronically using display 22.

EPL control circuit 16 displays an arrow 54 pointing to either currency indicator 50 or 52 to indicate to a customer whether the primary or the secondary price information is currently be displayed by display 22. Here, display 22 includes two pieces of cost information at a time in each currency, unit cost and total cost.

Figure 3:
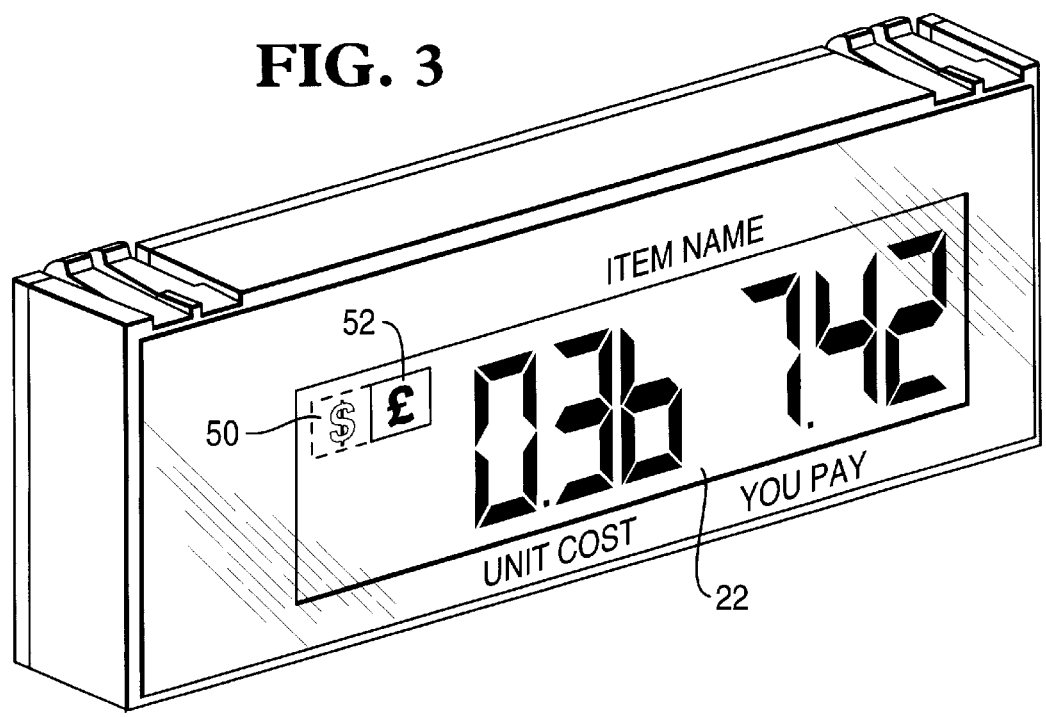
FIG. 3 is a perspective view of an EPL displaying a second currency indicator.

Turning now to FIG. 3, a second embodiment of EPL 14 is shown in more detail.

Here, EPL control circuit 16 displays either currency indicator 50 or 52.

Figure 4:
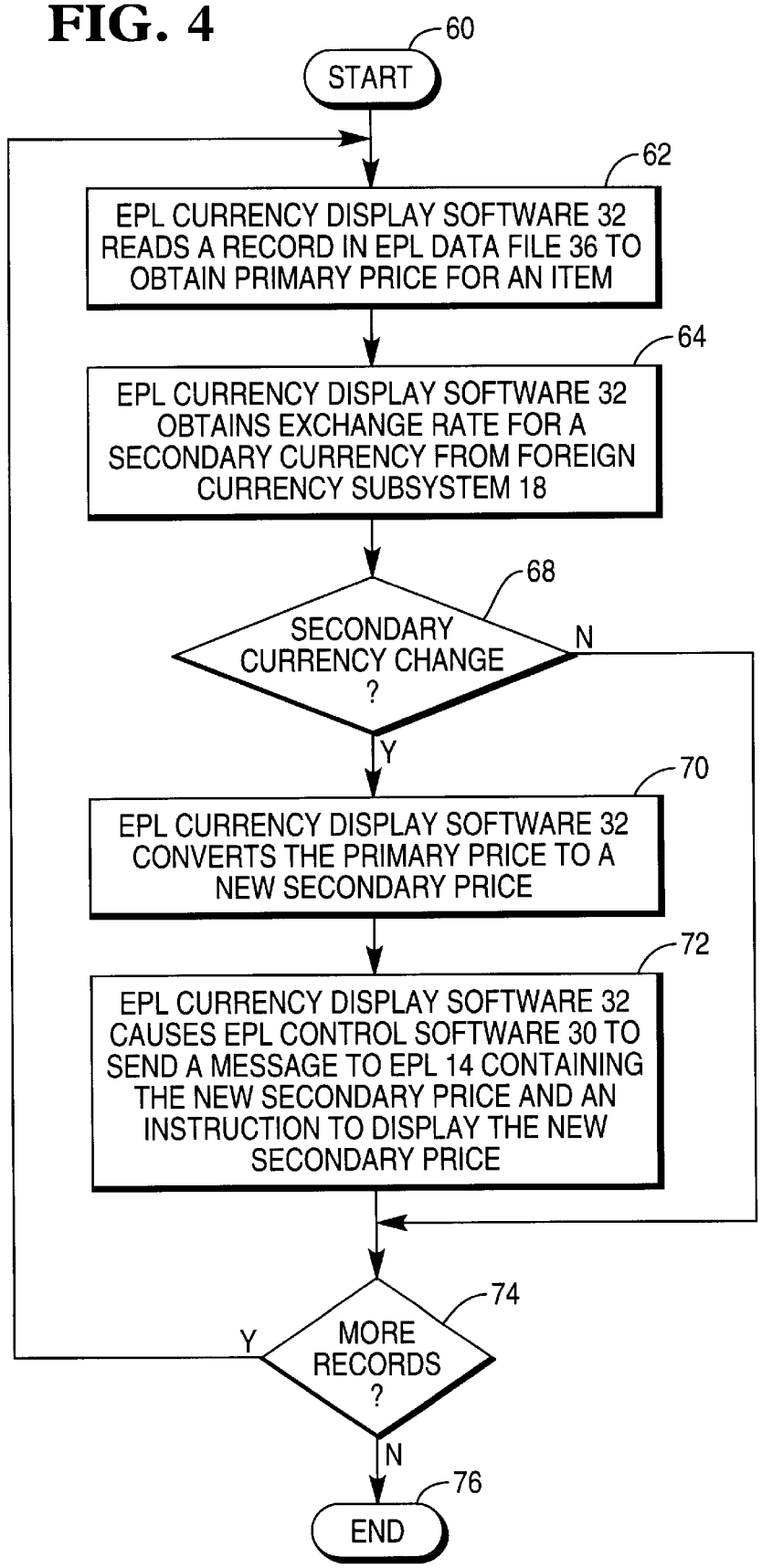
FIG. 4 is a flow diagram illustrating a first method of displaying prices in a plurality of different currencies.

Turning now to FIG. 4, the operation of EPL currency display software 32 as illustrated in FIG. 1 is illustrated beginning with START 60. In this embodiment, EPL currency display software 32 obtains price information for an item associated with an EPL from EPL data file 36. To determine secondary price information, EPL currency display software 32 obtains exchange rate information from foreign currency system 18 and uses the exchange rate information to convert the primary price information to the secondary price information.

In step 62, EPL currency display software 32 reads a record for an EPL in EPL data file 36 to obtain primary price information. Primary price information is price information terms of the primary currency out of a plurality of possible currencies. The primary price is the price in PLU data file 44. In the examples of FIGS. 2 and 3, the primary prices are in terms of U.S. Dollars. If EPL contains a checksum of the primary price instead, then EPL currency display software 32 calculates the primary price from the price checksum.

In step 64, EPL currency display software 32 obtains exchange rate information from foreign exchange currency system 18.

In step 68, EPL currency display software 32 determines whether the exchange rate for the secondary currency has changed. If so, operation proceeds to step 70 to initiate a price change message of the secondary price. If not, operation proceeds to step 74.

In step 70, EPL currency display software 32 converts the primary price to a secondary price.

In step 72, EPL currency display software 32 causes EPL control software 30 to send a message to EPL 14 containing the new secondary price and an instruction to display the new secondary price. The instruction may cause EPL 14 to display only the secondary price, or to display the primary and secondary prices in alternating fashion using the blinking or flashing mode of operation within control circuit 16.

In step 74, EPL currency display software 32 determines whether additional records in EPL data file 36 must be read. If so, operation returns to step 62. If not, operation ends in step 76.

EPL currency display software 32 may stop display of the primary and/or secondary price by causing EPL control software 30 to send a suitable command. Operation may include a separate "top" command, or combine the stop function with another command. For example, control circuit 16 may implement the stop function automatically whenever it receives a price change message.

Turning now to FIG. 6, the operation of EPL currency display software 32 as illustrated in FIG. 5 is illustrated beginning with START 80.

In step 82, EPL currency display software 32 waits for a price change in the primary currency.

In step 84, EPL currency display software 32 receives a price change in a primary currency from transaction processing system 40.

In step 86, EPL currency display software 32 obtains exchange rate for a secondary currency from foreign currency subsystem 18.

In step 88, EPL currency display software 32 converts the primary price to a secondary price.

In step 90, EPL currency display software 32 causes EPL control software 30 to send a message to EPL 14 containing the secondary price and an instruction to display secondary price. EPL control software 30 may send the price change in the secondary currency as one message, or combine the primary and secondary price changes into a single message.

Although the present invention has been described with particular reference to certain preferred embodiments thereof, variations and modifications of the present invention can be effected within the spirit and scope of the following claims. For example, more than two currencies may be displayed by EPLs 22. Also, the methods of FIGS. 4 and 6 may be combined so that price change messages are sent to an EPL when a change in the primary price has occurred or when a change in the exchange rate has occurred.

What is claimed is:

1. An electronic price label (EPL) comprising:

a display;

a memory for storing price, currency, and promotional information; and a control circuit for controlling the internal operation of the EPL including storage of received messages from a remotely located EPL computer and transmission of response messages to the EPL computer, and which further causes the display to display price information in a secondary currency based upon primary currency price information.

2. The EPL as recited in claim 1, wherein the control circuit further causes the display to display a currency symbol to inform a viewer of the currency upon which the price information is based.

3. The EPL as recited in claim 1, further comprising:

a housing containing the display and the control circuit and including a front surface containing an aperture which exposes the display; and an overlay attached to the front surface marked with a symbol for each of the different currencies;

wherein the control circuit further causes the display to display a currency indicator adjacent one of the symbols to inform a viewer of the currency upon which the price information is based.

4. A method of displaying secondary price information by an electronic price label (EPL) based upon a secondary currency in addition to primary price information based upon a primary currency comprising the steps of:

(a) obtaining the primary price information by a remotely located EPL computer;

(b) obtaining secondary currency exchange rate information for converting the primary price information to the secondary price information by the EPL computer;

(c) converting the primary price information to the secondary price information using the secondary currency exchange rate information by the EPL computer; and (d) sending a message to the EPL instructing the EPL to display the secondary price information by the EPL computer.

5. The method as recited in claim 4, further comprising the steps of:

(e) determining whether the secondary currency exchange rate information has changed by the computer; and (f) executing steps (c) and (d) if the secondary currency exchange rate information has changed by the computer.

6. The method as recited in claim 4, further comprising the step of:

(e) waiting for a change in the primary price information; and (f) performing steps (c) and (d) if the change occurs.

7. The method as recited in claim 4, wherein step (a) comprises the substep of:

(a-1) reading a record for the EPL in a data file containing the primary price information by the computer.

8. The method as recited in claim 7, further comprising the substep of:

(a-2) calculating a price for display from a price checksum within data file.

9. The method as recited in claim 4, wherein step (a) comprises the substep of:

(a-1) reading the primary price information from a price file.

10. The method as recited in claim 4, wherein step (b) comprises the substep of:

(b-1) obtaining the secondary currency exchange rate information from a foreign currency system.

11. The method as recited in claim 4, wherein step (d) comprises the substep of:

(d-1) sending a price change message to the EPL instructing the EPL to display only the secondary price by the computer.

12. The method as recited in claim 4, wherein step (d) comprises the substep of:

(d-1) sending a price change message to the EPL instructing the EPL to display the primary and secondary prices in alternating fashion.

13. An electronic price label (EPL) system comprising:

an EPL including
 a display;
 a memory for storing price, currency, and promotional information; and
 a control circuit for controlling the internal operation of the EPL including storage of received messages from an EPL computer and transmission of response messages to the EPL computer, and which further causes the display to display price information in a plurality of different currencies; and a computer which sends messages to the EPL instructing the EPL to display predetermined price information in the plurality of different currencies.

14. The system as recited in claim 13, wherein the computer also calculates the predetermined price information from primary price information based upon a primary currency using an exchange rate.

15. The system of claim 13 wherein the computer further comprises EPL software for generating price change messages, diagnostic messages, promotional messages and currency display control messages; and EPL currency display control software for determining the currency in which prices are to be displayed and the prices to be displayed in the determined currency.

16. The system of claim 15 wherein the computer utilizes the EPL currency display control software to convert primary currency price information to secondary currency price information.

17. The system of claim 16 wherein primary currency price information is stored in an EPL data file.

18. The system of claim 16 wherein primary currency information is stored in a price look up file for storing prices for merchandise items in a store.

19. The system of claim 16 further comprising a foreign currency system containing an exchange rate for converting primary currency price information to secondary currency price information.

20. The system of claim 19 wherein the computer is further operable to automatically initiate price changes whenever a primary price changes or the exchange rate changes.

* * * * *